(12) United States Patent
Yoakum et al.

(10) Patent No.: US 10,033,862 B2
(45) Date of Patent: Jul. 24, 2018

(54) EMERGENCY REQUEST PRIOR INSIGHT DELIVERY

(71) Applicant: Avaya Inc., Basking Ridge, NJ (US)

(72) Inventors: John H. Yoakum, Cary, NC (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/959,517

(22) Filed: Aug. 5, 2013

(65) Prior Publication Data

US 2015/0038102 A1 Feb. 5, 2015

(51) Int. Cl.
H04M 3/42 (2006.01)
H04M 3/51 (2006.01)
H04M 3/53 (2006.01)

(52) U.S. Cl.
CPC ..... H04M 3/42221 (2013.01); H04M 3/5116 (2013.01); H04M 3/5307 (2013.01)

(58) Field of Classification Search
CPC ...................................................... H04W 4/22
USPC ...................................................... 455/404.1
See application file for complete search history.

(56) References Cited

U.S. PATENT DOCUMENTS

| | | | | |
|---|---|---|---|---|
| 6,163,338 A * | 12/2000 | Johnson | ................. | H04N 7/188 348/143 |
| 6,778,818 B1 * | 8/2004 | O'Neil | .................. | 455/404.1 |
| 6,903,778 B1 * | 6/2005 | Kaku | ..................... | H04N 5/232 348/333.13 |
| 7,991,382 B1 * | 8/2011 | Gunasekara | ........ | H04L 12/6418 455/404.1 |
| 2002/0003576 A1 * | 1/2002 | Konishi | ................. | H04N 1/212 348/231.99 |
| 2005/0233733 A1 * | 10/2005 | Roundtree | .......... | G06F 9/45512 455/414.1 |
| 2006/0044407 A1 * | 3/2006 | Barbeau | ..................... | 348/211.3 |
| 2006/0092043 A1 * | 5/2006 | Lagassey | ............... | G07C 5/008 340/907 |
| 2007/0072581 A1 * | 3/2007 | Aerrabotu | .................. | 455/404.1 |
| 2010/0003950 A1 * | 1/2010 | Ray | ....................... | G10L 13/043 455/404.1 |
| 2010/0003953 A1 * | 1/2010 | Ray | ....................... | G10L 13/043 455/404.1 |
| 2010/0077441 A1 * | 3/2010 | Thomas | ................ | G06F 3/1415 725/133 |
| 2010/0219944 A1 * | 9/2010 | Mc Cormick | ......... | G07C 5/008 340/436 |
| 2011/0086607 A1 * | 4/2011 | Wang et al. | ............... | 455/404.1 |

(Continued)

Primary Examiner — Kathy Wang-Hurst
Assistant Examiner — Ernest Tacsik
(74) Attorney, Agent, or Firm — Sheridan Ross P.C.

(57) ABSTRACT

A communication endpoint is configured to record content, which may be audio content, video content, and/or other content, and send the recorded content to an endpoint, such as a contact center. In one instance, the communication endpoint initiates content recording upon the detection of an outbound user-initiated request, such as an emergency request, and transmits the recorded content when the communication session has been established. As another example, the communication endpoint may record content in a circular manner such that a latest content corresponding to a predetermined amount of time may be transmitted when the communication session has been established.

20 Claims, 11 Drawing Sheets

(56) References Cited

U.S. PATENT DOCUMENTS

| | | | |
|---|---|---|---|
| 2012/0142305 A1* | 6/2012 | Lane | H04N 7/18 |
| | | | 455/404.1 |
| 2012/0164968 A1* | 6/2012 | Velusamy et al. | 455/404.2 |
| 2013/0100238 A1* | 4/2013 | Wharton | G06K 9/00221 |
| | | | 348/14.08 |

* cited by examiner

EMERGENCY REQUEST PRIOR INSIGHT DELIVERY

FIELD OF THE DISCLOSURE

An exemplary embodiment is generally directed toward providing various amounts of insight determined from the instant a user initiates an emergency call or request, and in some embodiments even before the call or request is initiated.

BACKGROUND

Those attempting to assist someone reporting an emergency are often hampered by not knowing anything that is happening at the site of the emergency before the instant a related call is connected to the emergency center. It is a known problem that people making emergency calls are often unable to provide accurate information about the nature of the emergency. The reason that they are often unable to provide accurate information may be due to the caller being scared, incapacitated by the event that they are calling about, unable to speak without jeopardizing their safety, or the like. This tends to be problematic because, if a Public Safety Access Point (PSAP) call-taker has trouble figuring out the reason for the call, the response to the emergency may be delayed or inappropriate. Regardless of whether the caller is able to provide useful information to the PSAP, it is important to note that PSAP call-takers also listen carefully to the background sounds that are transmitted by the caller's device. For example, background sounds such as gun shots, music playing, tires squealing, people arguing (including the language of the argument), children crying, and so on can help the call-taker form a rapid, accurate assessment of the emergent event. The background sounds that occur in conjunction with, or soon after, the emergent event are often the most important.

Further, a PSAP may receive many calls from callers reporting an event. Generally, the event that people are calling about happened within seconds or minutes of the call being made and the event is generally audible or visible from the point where the call or other contact is being made. Even though regulations exist compelling PSAPs to answer requests for emergency assistance very quickly (in telephony situations within a couple of rings), situations emerge that can flood a PSAP such that the caller does not reach an agent for several minutes. This situation is exacerbated by the proliferation of mobile devices where many people may be simultaneously reporting the same event, each with their own unique perspective.

As shown and described in FIG. 1, an event may occur at a time equal to T0, designated by reference character 104. For example, the event may be a car accident, a theft, a medical emergency, etc. Shortly thereafter, for example at a time equal to T+1 designated by reference character 108, a caller may initiate a communication session or a phone call to report the event. In some scenarios, the initiation of a communication session may include a caller placing a phone call to a contact center typically associated with the event or the type of the event, as a non-limiting example. For instance, if the event is a car accident, a caller may place a call to a PSAP, such as 9-1-1 in the United States. Once the caller is connected to a contact center agent, for example a PSAP call-taker, at a time equal to T+2 designated by reference character 112, the caller may provide information they have concerning the event to the call-taker, at a time equal to T+3 designated by reference character 116. In some situations, there may be a delay between the time a caller places a phone call (T+1) and a time in which the information is provided to a call-taker (T+3). Moreover, in some situations, a caller placing a phone call may not be able to provide a call-taker with any information. For example, the caller's phone may turn off, the caller may not be able to speak, and/or the caller may become incapacitated.

SUMMARY

It is with respect to the above issues and other problems that the embodiments presented herein were contemplated. This disclosure provides, among other things, the ability to record content information that occurs between the time when a caller initiates a communication session, such as placing a call or initiating an emergency request to a contact center, and the time the communication session becomes established, such as when the requester is connected to the call-taker. In one embodiment, a device making an emergency request or call, may record locally (buffer) all audio and/or video (if the device has a camera) from the instant an emergency (911 or similar) call is dialed (or other form of emergency request such as a browser-initiated Web Real-Time Communication (WebRTC) session is initiated). The device may then transmit both the live and buffered streams once a connection to a PSAP or other emergency resource is established. This buffering can capture and provide vital early insight before any emergency request is actually connected which may be helpful once the request is connected.

In some embodiments, the ability to record content may depend on one or more capabilities and/or parameters of the device used to initiate the communication session. For instance, if the device is a mobile device, such as a mobile phone, tablet, laptop etc., the device may rely on a portable power source and therefore may be power constrained. That is, the power (e.g. available power) may limit an amount of content and/or duration that may be recorded. Further, in a power-constrained device, the device may begin recording content upon the initiation of an action, such as initiating a communication request to a PSAP or other contact center.

In embodiments having a communication device that is not power constrained, a short predetermined buffer of audio and/or video may be constantly recorded and provided when the emergency request is connected. In this situation, and to address privacy concerns, several embedded constraints may be necessary. For example, the system may provide access to and/or transmit the buffer as part of an outbound user-initiated emergency request once the call or interaction has actually been established with a verified PSAP. Additionally, the device may have a visual indicator to visually indicate that such buffering is enabled and active. Moreover, since it is likely that users may demand a simple method to disable such buffering for some reasonable duration, on demand, to feel good about engaging in some conversation or activity in the vicinity of such a device, a method of disabling such buffering, for example a button to press, may be provided. Likewise, some users may demand a method to erase the buffer on demand, such as an "erase buffer now" button or other interface, to destroy or delete something they have just said or shown. While this embodiment offers some unique advantages in certain situations and various implementation approaches are contemplated, many users may feel uncomfortable trusting that a live microphone and/or camera are actually being used appropriately. Therefore, in some embodiments, the local buffering stops once live streams are established, such as when a communication session is established with the call-taker. In other embodiments, pre-event buffering is performed on an ongoing basis and stored in a predefined duration buffer that is constantly overwritten.

Depending on how an emergency request is being transmitted and/or connected, or what technology may be used to transport the emergency request, various methods are available to send the buffered stream(s). The buffer capable of recording content and the associated transport streams and/or medium may be incorporated in any end-user device. Such end-user device may include, but is not limited to phones, smartphones, tablets, computer clients, WebRTC browser instances, and any other form of end-user device or client capable of communication with an emergency response center, such as a contact center.

Additionally, in one embodiment, remote buffering may be implemented. For example, devices including, but not limited to, wired enterprise phones that may not have an internal buffer or portable power source, desktop phones, Web-centric applications, softphone applications, and other applications capable of communicating a request, may buffer recorded content at a buffer location other than at the device. In some situations, the buffering may be in the local enterprise communication server and/or switch. Further, embodiments incorporating remote buffering may utilize encrypted or otherwise protected media and/or methods of communication such that any content to be located in the remote buffer is protected from observation while in transit as well as in storage. Additionally, access to this remote buffer may implement the same or similar controls as imposed on local storage as described above, as well as providing a caller with the ability to disable or erase the buffer. Further, for devices utilizing remote buffering, an indicator may be provided on the device where the media originates from that informs a caller of the streaming of media and/or the existence of recorded media.

In one embodiment, a method is provided, the method comprising detecting, at a first endpoint, an initiation of a communication session between the first endpoint and a second endpoint, based on the detected initiation of the communication session, recording, by the first endpoint, content to at least one buffer, detecting that the communication session has been established, and transmitting to the second endpoint, at least a portion of the recorded content upon the establishment of the communication session.

In yet another embodiment, another method is provided, the method comprising recording, by a first endpoint, content to at least one buffer, initiating a communication session between the first endpoint and a second endpoint, detecting that the communication session has been established, and transmitting to the second endpoint, at least a portion of the recorded content upon the establishment of the communication session, wherein the at least a portion of the recorded content includes content that is temporally adjacent and prior to at least one of the initiation of the communication session and the establishment of the communication session.

Additionally, a system for providing insight prior to an emergency request is provided, the system comprising a first endpoint, a second endpoint, and at least one circular buffer located at one or more of the first endpoint and the second endpoint, the at least one buffer recording content in response to profile information, wherein the first endpoint is configured to transmit to the second endpoint at least a portion of the recorded content upon the establishment of a communication session between the first endpoint and the second endpoint, and wherein the profile information configures the first endpoint to at least one of (i) record content to the at least one circular buffer in response to an outbound user-initiated emergency request, and (ii) record content to the at least one circular buffer for a predetermined period of time such that the at least a portion of the recorded content is temporally adjacent and prior to at least one of an outbound user-initiated emergency request and the establishment of the communication session.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation, or technique.

The term "module," as used herein, refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

Exemplary embodiments of the present disclosure are described in conjunction with the appended figures where.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Furthermore, while embodiments of the present disclosure will be described in connection with Public Safety Access Point (PSAP) examples, it should be appreciated that embodiments of the present disclosure are not so limited. In particular, embodiments of the present disclosure can be applied to any contact center construct and, in some embodiments, may also be utilized in non-contact center settings. For instance, any communication scenario involving or requiring the buffering of content and the subsequent transmission to a receiving entity may utilize the embodiments described herein. The usage of PSAP examples is for illustrative purposes only and should not be construed as limiting the claims. For example, noting that the flight data recorder and/or cockpit voice recorder are often destroyed or missing after an aircraft accident, an alternative embodiment of the proposed invention may cause some or all of the recordings to be transmitted automatically if the pilot declares an emergency (e.g., a "MayDay").

Figure 1:
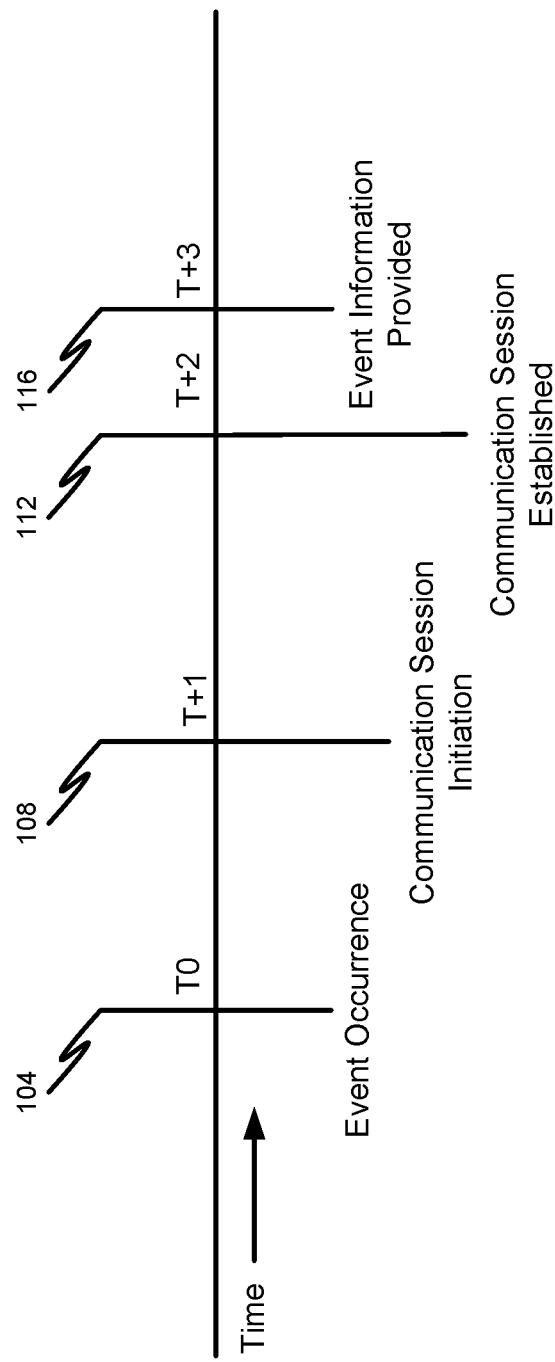
FIG. 1 is a timing diagram of a communication process in accordance with an exemplary embodiment of the present disclosure.

In accordance with some embodiments of the present disclosure, FIG. 1 illustrates a diagram showing one or more items of information corresponding to time periods associated with a contact made by an endpoint. For example, and as previously described, an event may occur at a time equal to T0, designated by reference character 104. The event may be a car accident, a theft, a medical emergency, etc. Shortly thereafter, for example at a time equal to T+1 designated by reference character 108, a caller may initiate a communication session or a phone call to report the occurrence of the event. In some scenarios, the initiation of a communication session may include a caller placing a phone call to an endpoint, such as a contact center typically associated with the event or the type of the event. For instance, if the event is a car accident, a caller may place a call to a PSAP, such as 9-1-1 in the United States. Once the caller is connected to a contact center agent, for example a PSAP call-taker, at a time equal to T+2 designated by reference character 112, the caller may provide information they have about the event to the call-taker, at a time equal to T+3 designated by reference character 116. That is, once the communication session is established with the call-taker, the caller may then provide such information.

Figure 2:
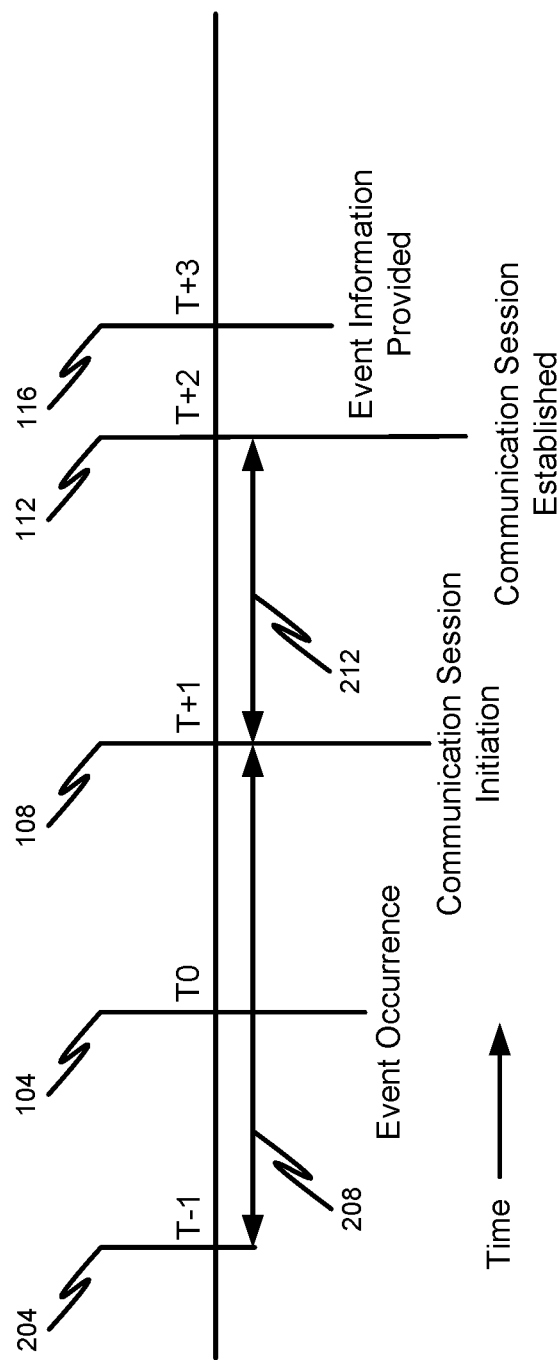
FIG. 2 is a second timing diagram of a communication process in accordance with an exemplary embodiment of the present disclosure.

In accordance with some embodiments of the present disclosure, a communication endpoint, such as a communication device associated with a caller, may record information corresponding to the various time periods illustrated in FIG. 2. For example, the endpoint may record content upon the initiation of a communication session corresponding to a time of T+1 (reference character 108). Thus, once the communication session is established, for example, with an entity at a contact center or PSAP, with another endpoint, and/or with a call-taker, the recorded content may be transferred from the caller's communication device to the endpoint, or a device associated with the endpoint, at a time of T+2 (reference character 112). That is, recorded content such as audio, video, location information, other media content, or other sensor data may be recorded for a time period corresponding to 212. It is important to note that the additions and subtractions to T simply indicate a progression of time; that is, there are no units assigned to a time equal to T, T+1, T+2, and/or T+3.

As one example, a caller may initiate a communication session, using a communication device, to communicate with an emergency contact center, wherein the emergency contact center is a PSAP. Such an initiation of a communication session may correspond to an outbound user-initiated emergency request. Upon the initiation of the communication session, the caller's communication device, or endpoint, may record content, for example audio information, and store the recorded content locally in a buffer (e.g., memory) for the period of time corresponding to 212 (that is, between the time 108 when the caller initiates the communication session and the time 112 when the communication session is established with the contact center). In some situations, the stored audio information may correspond to information about the event. For example, the caller may be talking to a fellow passenger, pedestrian, or bystander about the event; such audio information may be recorded by the caller's communication device and transmitted, upon an establishment of the communication session, to the PSAP (e.g., the event information is provided at T+3, reference character 116). Thus, the endpoint, for example the PSAP, may receive and review the information provided by the caller's communication device and utilize the information when preparing a response to the event occurrence. In addition, the caller may provide additional information to the endpoint, in real-time, once the communication session is established (e.g., 112). Alternatively, or in addition, the communication device may establish a second communication session with the PSAP and transmit the recorded content via the second communication session; in such an instance, the first communication session may be used to allow the user to interact, in real-time, with an agent of the PSAP. In the case of WebRTC, a WebRTC data flow may be established that is affiliated with a WebRTC media flow, where the data flow is used to transmit the recorded content.

Moreover, in instances where a caller is able to provide information about an event and/or situation for a time period corresponding to 212, but is not able to provide real-time information after being connected to a call-taker, the content recorded during a period of time corresponding to 212 may be provided to the emergency contact center without the caller's assistance. For example, a caller may be involved in a vehicular accident in which the caller is able to initiate a communication session to an emergency contact center, for instance, 9-1-1 in the United States. Upon initiating the communication to 9-1-1 (e.g., an emergency number), but before the communication session is established with the 9-1-1 contact center and/or dispatcher, the caller's communication device may start recording and record audio and/or video information; the caller may be speaking and may even provide details of the vehicular accident and injuries, if any. Alternatively, or in addition, the caller's communication device (e.g., communication endpoint) may record content provided by bystanders, for example, voices speaking to the caller and/or describing the injuries of the caller. Once the communication session is established with the contact center and/or the call-taker, the caller's communication device may transmit the recorded content to the endpoint. Therefore, even if the caller were to lose consciousness prior to the communication session becoming established, information recorded by the caller's communication device may still be provided to the emergency contact center and used to dispatch appropriate resources.

In some instances, a communication device may continuously record content corresponding to a period of time 208 prior to the initiation of the communication session. For example, a communication device, or endpoint, may continuously record the last five minutes of content such that the oldest recorded content is overwritten if the storage location, such as a buffer, becomes full. If an event were to occur at T0 while a communication device is recording content in such a manner, then upon establishment of a communication session (e.g., 112), recorded content associated with pre-event information (from T−1 to T0), recorded content associated with the event (T0), and/or recorded content associated with post-event information (from T0 to T+1 and/or T0 to T+2) may be provided to an endpoint. Thus, the details associated with an event, pre- and post-event, may be recorded and provided to an endpoint.

Figure 3:
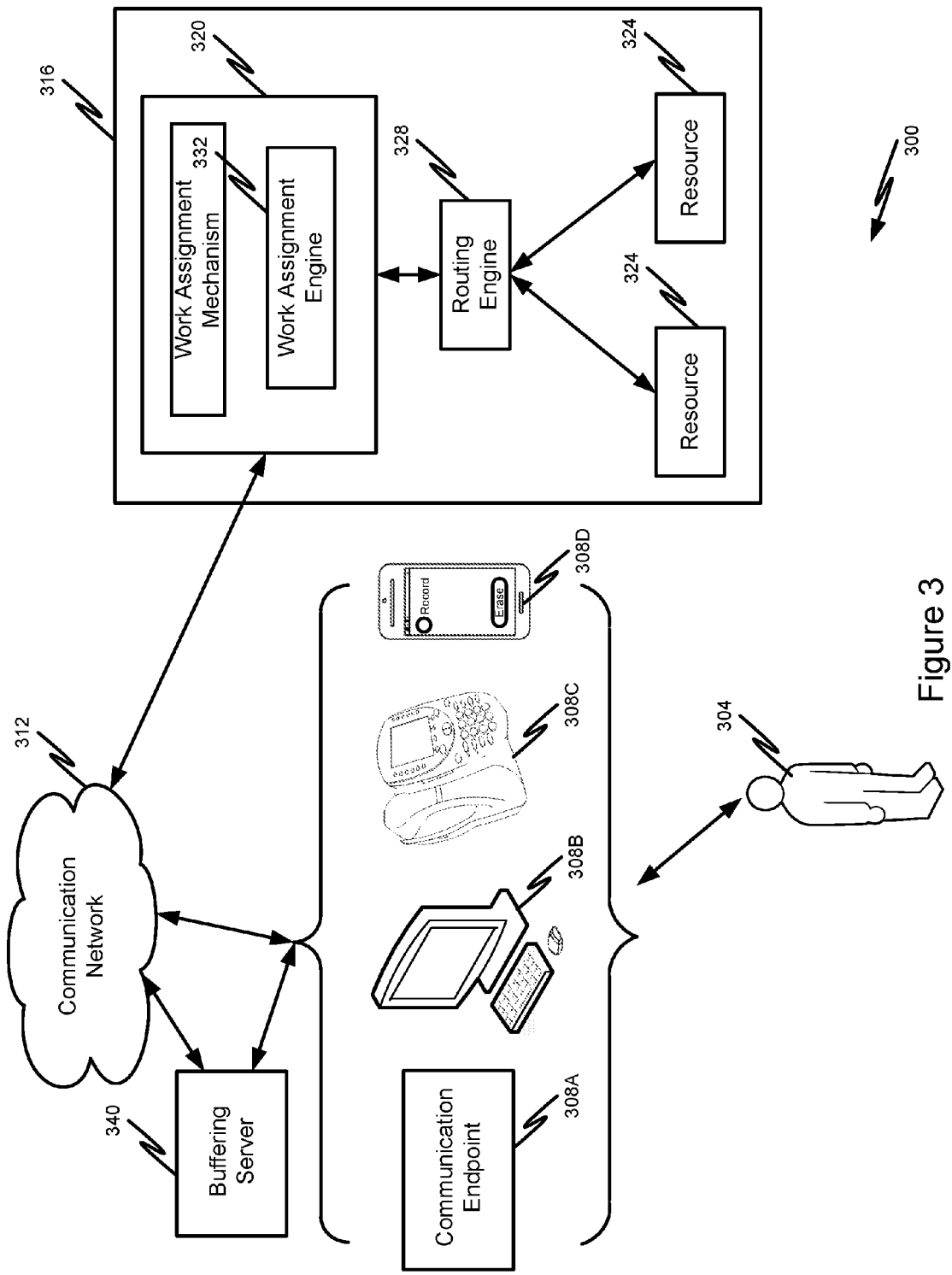
FIG. 3 is a system diagram of a communication system in accordance with an exemplary embodiment of the present disclosure.

FIG. 3 is an example diagram depicting a communication system 300 in accordance with some embodiments of the present disclosure. The communication system 300 may be a distributed system and, in some embodiments, comprises a communication network(s) 312 connecting one or more communication endpoints 308A-308D to a contact center, such as a PSAP 316. In some embodiments, the PSAP 316 includes a work assignment mechanism 320, which may be owned and operated by an enterprise or government agency administering a PSAP in which a plurality of resources 324, such as call-takers, are distributed to receive and respond to contacts, or calls, from communication endpoints 308A-308D. In some embodiments, the PSAP is responsible for answering contacts to an emergency telephone number, such as 9-1-1 in the United States (or, for example 1-1-2 in Europe), for police, firefighting, ambulance, and other emergency services. Trained telephone operators, such as agents or call-takers, are usually responsible for dispatching these emergency services. Most PSAPs are capable of knowing caller location from landline calls, and many can know mobile phone locations as well (sometimes referred to as phase II location), where the mobile phone company has a handset location system (such as a satellite positioning system). If a governmental entity operates its own PSAP 316, but not its own particular emergency service (for example, for a city-operated PSAP, there may be county fire but no city police), it may be necessary to relay the call to the PSAP that does handle that type of call.

The communication network 312 may be packet-switched and/or circuit-switched. An illustrative communication network 312 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, WebRTC enabled network, or combinations thereof. The Internet is an example of the communication network 312 that constitutes an Internet Protocol (IP) network including many computers, computing networks, and other communication devices located all over the world, which are connected through many communication systems and other means. In one configuration, the communication network 312 is a public network supporting the TCP/IP suite of protocols. Communications supported by the communication network 312 include real-time, near-real-time, and non-real-time communications. For instance, the communication network 312 may support voice, video, text, web-conferencing, or any combination of media and may facilitate one or more signaling protocols to set up, maintain, and/or teardown a communication session, communication thread, communication flow, and the like. Moreover, the communication network 312 may comprise a number of different communication media such as coaxial cable, copper cable/wire, fiber-optic cable, antennas for transmitting/receiving wireless messages, and combinations thereof. In addition, it can be appreciated that the communication network 312 need not be limited to any one network type, and instead may be comprised of a number of different networks and/or network types. For illustrative purposes, a person 304 who experiences an emergency, witnesses an emergency, is simply a bystander, or has a desire to contact the contact center may use a communication endpoint 308A-308D to initiate contact with or call into a PSAP 316 via the communication network 312. It should be appreciated that the communication network 312 may be distributed. Although embodiments of the present disclosure will refer to one communication network 312, it should be appreciated that the embodiments claimed herein are not so limited. For instance, multiple communication networks 312 may be joined by many servers and networks.

In accordance with at least some embodiments of the present disclosure, a communication device or communication endpoint 308A-308D may comprise any type of known communication equipment or collection of communication equipment. Examples of a suitable communication endpoint 308A-308D may include, but are not limited to, a personal computer 308B or laptop, a cellular phone, a smartphone 308D, a telephone, a tablet, an enterprise telecommunication device 308C, a telephony application residing on the one or more previously listed devices, a browser or "app" residing on the one or more previously listed devices, or other communication device 308A that can make or receive communications. In general, each communication endpoint 308A-308D may provide many capabilities to the caller 304. These capabilities may include, but are not limited to, video, audio, text, applications, and/or data communications and the ability to access call-takers and/or resources 324 as well as other services provided by the PSAP 316. In one application, the communication endpoints 308A-308D are video telephony devices (e.g., video phones, telepresence devices, a camera-equipped cellular or wireless phone, a mobile collaboration device, and a personal tablet, or laptop computer with a camera or web camera). The type of medium used by the communication endpoint 308A-308D to communicate with a resource 324 may depend upon the communication applications available on the communication endpoint 308A-308D. Further, communication endpoints 308A-308D may utilize real-time communication capabilities, such as WebRTC, to communicate with a contact center 316. As can be appreciated, other communication protocols such as SIP, RTP, SRTP, H.323 and one or more APIs may be supported by an endpoint 308A-308D and a contact center, such as a PSAP 316, to facilitate communications.

In accordance with some embodiments of the present disclosure, a caller may utilize their communication endpoint 308A-308D to initiate a communication, or contact, with a PSAP, such as PSAP 316, to initiate a work item, which is generally a request for a resource 324. An exemplary work item may include, but is not limited to, a multimedia contact directed toward and received at a PSAP. The work item may be in the form of a message or collection of messages, or real-time flow, that is transmitted from the communication endpoint 308A-308D, over the communication network 312, and received at the PSAP 316. For example, the work item may be transmitted as a telephone call, a packet or collection of packets (e.g., IP packets transmitted over an IP network), an email message, an instant message, a Short Message Service (SMS) message, a fax, a video chat, a WebRTC media or data flow, and combinations thereof. In some embodiments, the communication may not necessarily be directed at the work assignment mechanism 320, but rather be directed to a queuing server that creates, maintains, makes available and/or delegates one or more offers and/or flows to a resource 324 in connection with a Web-RTC platform. For example, the communication endpoint 308A-308D may create and/or answer an offer in connection with one or more flows in order to initiate a communication request. Such a request may then be queued in a queuing server until an appropriate resource 324 becomes available. Further, the queue position of a caller 304 may depend on content transmitted from the communication endpoint 308A-308D. In some embodiments, the communication may be directed to some other server in the communication network 312 or PSAP 316 where it is harvested by the work assignment mechanism 320, which generates a work item for the harvested communication.

The format of a work item may depend upon the capabilities of the communication endpoint 308A-308D and the format of the communication. In particular, work items may be logical representations within a PSAP of work to be performed in connection with servicing a communication received at the PSAP, and more specifically, the work assignment mechanism 320. The communication may be received and maintained at the work assignment mechanism 320, a switch or server connected to the work assignment mechanism 320, or the like until a resource 324 is assigned to the work item representing the communication at which point the work assignment engine 332 passes the work item assignment decision to a routing engine 328 to connect the communication endpoint 308A-308D, which initiated the communication, with the assigned or selected resource 324. Although the routing engine 328 is depicted as being separate from the work assignment mechanism 320, the routing engine 328 may be incorporated into the work assignment mechanism 320, or its functionality may be executed by the work assignment engine 332.

In accordance with at least some embodiments of the present disclosure, the work item is sent toward a collection of processing resources 324 via the combined efforts of the work assignment mechanism 320 and a routing engine 328. The resources 324 may either be completely automated resources (e.g., Interactive Voice Response (IVR) units, processors, servers, or the like), human resources utilizing communication devices (e.g., one or more human agents/call-takers utilizing a computer, telephone, laptop, etc.), or any other resource known to be used in a PSAP environment.

In some embodiments, the work assignment mechanism 320 comprises a work assignment engine 332, which enables the work assignment mechanism 320 to make intelligent routing decisions for work items. More specifically, the work assignment engine 332 can determine which of the plurality of processing resources 324 is qualified, skilled, and/or eligible to receive the work item and further determine which of the plurality of processing resources 324 is best suited to handle the processing needs of the work item. In situations of work item surplus, the work assignment engine 332 can also make the opposite determination (i.e., determine optimal assignment of a resource 324 to a work item). In some embodiments, the work assignment engine 332 may be configured to achieve true one-to-one matching by utilizing bitmaps/tables and other data structures.

The work assignment engine 332 may reside in the work assignment mechanism 320 or in a number of different servers or processing devices. In some embodiments, cloud-based computing architectures can be employed whereby one or more components of the work assignment mechanism 320 are available in a cloud or network such that they can be shared among a plurality of different users.

As previously discussed, a Public Safety Access Point (PSAP) 316 may typically be a contact center that answers calls to an emergency telephone number. Examples of services that may be offered by a PSAP 316 via the communication network 312 include communication services, media services, information services, processing services, application services, combinations thereof, and any other automated or computer-implemented services, applications, or telephony features. Trained call-takers, or agents, may attempt to address events using procedural guidelines and experiential knowledge. That is, the call-taker may communicate with the caller 304 in such a way as to receive information regarding the event or emergency from a caller 304.

In accordance with at least some embodiments of the present disclosure, the communication network 312 may further include a separate buffering server 340 that allows a communication endpoint 308A-308D to remotely buffer content available to the communication endpoint 308A-308D. For example, a communication endpoint 308 may not have memory or the processing ability to record and store content, such as audio content from a microphone, video content from a camera, image content from a camera, and/or other data content. In such instances, the communication endpoint 308A-308D may transmit, record, or otherwise store such content at a buffering server 340. The buffering server 340 may be located within an enterprise network, within a communication network 300 and/or may be located at a network communication server and/or switch, PBX server, web server, data server, other communication endpoint 308A-308D, in the cloud or combinations thereof. It should be appreciated that although FIG. 3 depicts a buffering server 304 in between the communication network 312 and the communication endpoint 308A-308D, other configurations are possible; for example, the buffering server may reside between the communication network 312 and the contact center 316.

Figure 4:
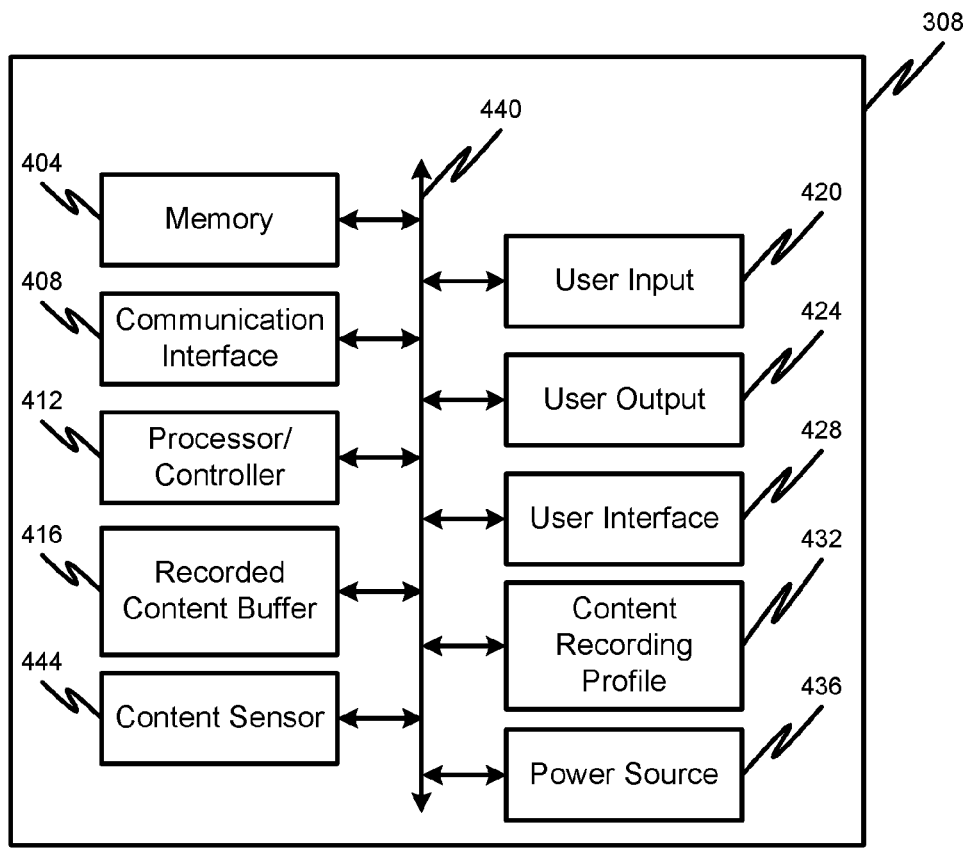
FIG. 4 is a block diagram of a communication endpoint in accordance with an exemplary embodiment of the present disclosure.

FIG. 4 illustrates a block diagram depicting one or more components of an endpoint 308A-308D in accordance with at least some embodiments of the present disclosure. In some embodiments, the communication endpoint 308A-308D may include a processor/controller 412 capable of executing program instructions. The processor/controller 412 may include any general purpose programmable processor or controller for executing application programming. Alternatively, or in addition, the processor/controller 412 may comprise an application specific integrated circuit (ASIC). The processor/controller 412 generally functions to execute programming code that implements various functions performed by the associated server or device. The processor/controller 412 of the endpoint 308A-308D may operate to initiate and establish a communication session.

The communication endpoint 308A-308D may additionally include memory 404. The memory 404 may be used in connection with the execution of programming instructions by the processor/controller 412, and for the temporary or long-term storage of data and/or program instructions. For example, the processor/controller 412, in conjunction with the memory 404 of the communication endpoint 308A-308D, may implement emergency services telephony, application, and web services that are needed and accessed by one or more communication endpoint 308A-308D.

The memory 404 of the communication endpoint 308A-308D may comprise solid-state memory that is resident, removable and/or remote in nature, such as DRAM and SDRAM. Moreover, the memory 404 may comprise a plurality of discrete components of different types and/or a plurality of logical partitions. In accordance with still other embodiments, the memory 404 comprises a non-transitory computer-readable storage medium. Such a medium may take many forms, including, but not limited to, non-volatile media, volatile media, and transmission media.

The communication endpoint 308A-308D may further include a recorded content buffer 416, a user input 420, a user output 424, a user interface 428, a content recording profile 432, a communication interface 408, an optional power source 436, and a content sensor 444. The communication interface 408 may comprise a Global System for Mobile communication (GSM), Code Division Multiple Access (CDMA), Frequency Division Multiple Access (FDMA) and/or analog cellular telephony transceiver capable of supporting voice, multimedia and/or data transfers over a cellular network. One or more components of the communication endpoint 308A-308D may communicate with another utilizing a communications bus 440. Alternatively, or in addition, the communication interface 408 may comprise a Wi-Fi, BLUETOOTH™, Worldwide Interoperability for Microwave Access (WiMAX), infrared, Near Field Communication (NFC), or other wireless communications link. The communication interface 408 may be associated with one or more shared or dedicated antennas. The type of medium used by the communication endpoint 308A-308D to communicate with other communication devices and/or contact centers 316 may depend upon the communication applications' availability on the communication endpoint 308A-308D and/or the availability of the communication medium.

The communication endpoint 308A-308D may optionally include a user interface 428 allowing a user 304 to interact with the communication endpoint 308A-308D. For example, the user 304 may be able to enter a contact address, such as a telephone number or email address, and initiate a communication with a user and/or entity having such a telephone number or email address. Moreover, the user 304 may interact with the user interface 428 to configure one or parameters of the communication endpoint 308A-308D, operate or otherwise interact with one or more applications running on the communication endpoint 308A-308D, and configure one or more user profile 432. Examples of user input devices 420 include a keyboard, a numeric keypad, a touch screen, a microphone, scanner, and pointing device combined with a screen or other position encoder. Examples of user output devices 424 include a display, a touch screen display, a speaker, and a printer.

The content sensor 444 may comprise one or more sensors that detect and/or measure information external to the communication endpoint 308A-308D and/or information relating to the communication endpoint 308A-308D. For example, the content sensor 444 may include, but is not limited to, a camera, a microphone, a video camera, a Global Position Sensor (GPS) sensor, a location sensor, an accelerometer, a magnetometer, and the like. The content sensor 444 may receive or otherwise provide audio content, video content, image content, and the like to the communication endpoint 308A-308D. In some embodiments, the one or more sensors may be utilized in combination to detect or measure certain information and/or provide a common interface for such information. For example, a camera may record location information, lighting condition information, frame rate, exposure time, and the like, and include such information as Exchangeable Image File Format (EXIF) data. In some embodiments, the EXIF data may generally be considered a content sensor 444 while in other embodiments, the content sensor may 444 may be more granular and may be specific to lighting condition information.

Alternatively, or in addition, the content sensor 444 may comprise one or more health sensors for detecting and/or recording health information of a user. For example, the content sensor 444 may measure the following non-limiting items: pulse, amount of oxygen in a user's blood, a rate of breath, a body temperature, an electrocardiogram, a glucose level, a galvanic skin responses, a blood pressure, and a position of a user. In some instances, the measurement of one or more items may be unobtrusive or otherwise occur in the background while the user is utilizing the communication endpoint 308A-308D for a purpose other than monitoring health information. For example, a heart rate and/or heart rhythm irregularity may be identified and/or recorded based on one or more techniques described in copending U.S. application Ser. No. 13/930,388 entitled "Personal Electronic Devices With Unobtrusive EKG-Based Detection Of Heart Rate and Rhythm Anomalies," filed Jun. 28, 2013, now published as US 2015/0005653, which is hereby incorporated herein by reference in its entirety for all that it teaches and for all purposes. The content sensor 444 may comprise the necessary hardware/biometric acquisition devices to record the health information associated with a user.

The recorded content buffer 416 may comprise a dedicated or shared location for storing content. Recorded content buffer 416 is, in some embodiments, located within the memory 404 and/or may comprise the same memory as memory 404. In other embodiments, recorded content buffer 416 comprises one or more memory components separate from memory 404. In some embodiments, recorded content buffer 416 may comprise a ring buffer and/or contain the necessary functionality to implement a ring buffer. For example, the recorded content buffer 416 may operate as a First-In First-Out buffer to store a latest content, wherein when the buffer gets full, old data is overwritten. In other embodiments, a linked-list approach may be utilized to construct the necessary functionality to record a latest content.

In some embodiments and consistent with the present disclosure, the communication endpoint 308A-308D may include a content recording profile 432. The content recording profile 432 may include one or more parameters that modify how and when the communication endpoint 308A-308D records content. For example, at least one parameter may configure the communication endpoint 308A-308D in a manner such that content recording is initiated when a communication session is initiated. Further, the content recording profile 432 may include one or more contact addresses (e.g., phone numbers, email addresses, SIP addresses, user names, handles, etc.) associated with the communication session initiation. For example, a content recording profile 432 associated with a user 304 utilizing the communication endpoint 308A-308D may configure the communication endpoint 308A-308D such that the communication endpoint 308A-308D starts recording content when a communication session is initiated and directed to the one or more predetermined contact addresses. Content recording profile 432 may also include one or more parameters indicating whether or not to record content, a length of time for recording (e.g., continuously record the last five minutes), one or more parameters limiting an amount of content recorded (e.g. 35 megabytes), one or more parameters indicating the type of content to record (e.g. audio content, video content, image content, location content, etc. . . . ), and one or more parameters indicating whether or not content should be continuously recorded.

Moreover, since some communication endpoints 308A-308D may operate using a portable power source, such as the power source 436, the content recording profile 432 may specify one or more configurations that depend on a power level of the communication endpoint 308A-308D. For example, when the power level of the communication endpoint 308A-308D is greater than or equal to a threshold, the communication endpoint 308A-308D may be configured to continuously record content such that content corresponding to the last X minutes (e.g., last five minutes) is available for transmission to a contact center. Further, when the power level of the communication endpoint 308A-308D is less than or equal to a threshold, the endpoint device 308A-308D may be configured such that content is recorded only when a communication session is initiated. Further still, if the power level is less than or equal to a second threshold, the communication endpoint 308A-308D may be configured such that only content of a specific type (e.g., audio content) is recorded. Therefore, based on one or more configurations in the content recording profile 432, optimum content for a specified power level may be recorded.

In accordance with some embodiments of the present disclosure, the content recording profile 432 may be configured such that the content to be recorded, both in continuous mode and/or in a communication session initiation mode, is stored remotely. For example, when content is received at a communication endpoint 308A-308D (e.g., received from a video camera, microphone, GPS, of a content sensor 444, or otherwise), the endpoint 308A-308D may store the content at a location not within the communication endpoint 308A-308D; for instance, the content may be stored at a buffering server 340. As one example, in an enterprise environment where a communication endpoint 308A-308D does not rely upon a portable power source and/or includes one or more communication networks 312 that provide high data transfer rates, a communication endpoint 308A-308D may continually store recorded content at the buffering server 340; thus, the communication endpoint 308A-308D is not responsible for maintaining the content locally. Of course, in other instances, the communication endpoint 308A-308D may temporarily store such content and transfer the stored content to the buffering server 340 according to a predetermined event, such as a specific time, content amount, etc.; thus, the communication endpoint 308A-308D may be thought of as a staging location and the buffering server 340 may be thought of as a destination location for the content. Although the buffering server 340 is illustrated as a separate entity, in some embodiments, the buffering server 340 may reside within the PSAP 316.

In accordance with some embodiments of the present disclosure, the contact center 316 may access the content stored at a communication endpoint 308A-308D or at the buffering server 340 based on a communication session initiation of the communication endpoint 308A-308D, or based on a communication session initiation of another, e.g., different, communication endpoint 308A-308D. For example, a user 304 may experience one or more events, such as a medical event. In such an instance, content associated with or stored by other communication endpoints 308A-308D located around user 304 may be transmitted to the PSAP 316 such that one or more call-takers at the PSAP 316 may review the content. Moreover, in instances where content is stored at a buffering server 340, the PSAP 316 may access the stored content associated with one or more other communication endpoints 308A-308D. Alternatively, or in addition, the buffering server 340 may transmit the content to the PSAP 316.

As another non-limiting example, a content sensor 444 of a communication endpoint 308A-308D may be recording health information of a user to a circular buffer; that is, the buffer may be configured to record the last ten minutes of a user's health information. Such health information may include the user's heart rate, heart rhythm, and temperature. If, for example, the user experiences a medical event and initiates an emergency request to a PSAP (e.g., 9-1-1 in the United States), upon the establishment of a communication session, the user's endpoint 308A-308D may transmit to the PSAP the recorded health information. In such an instance, the endpoint 308A-308D may capture and report the medical event that led to the emergency request (e.g., the 9-1-1 call).

In accordance with embodiments of the present disclosure, content recorded by communication endpoint 308A-308D may be protected in a manner such that only authorized entities, such as an authorized PSAP 316, may have access to the content when transmitted. For example, content transmitted from the communication endpoint 308A-308D may be encrypted utilizing one or more encryption routines such that the destined entity, such as PSAP 316, may decrypt the transmitted content. For instance, the communication endpoint 308A-308D may utilize symmetric and/or asymmetric keys to encrypt the stored content; the communication endpoint 308A-308D and the destined entity, such as PSAP 316, may then undergo a key exchange process so that the PSAP 316 can decrypt and access the encrypted content. In other example, the endpoint 308A-308D may authorize one or more PSAPs 316 to access content stored. In one instance, a user 304 may register their endpoint 308A-308D with a specified PSAP, and/or alternatively register their endpoint 308A-308D with one or more authentication and/or authorization services that provide a PSAP, contact center, and/or other endpoint with access to the content recorded in the buffer. Thus, only the recorded content in the buffer is accessible by/to certain endpoints.

Alternatively, or in addition, content stored at a buffering server 340 may be similarly protected such that the content is encrypted and one or more access controls are utilized to limit access to the content. For instance, the communication endpoint 308A-308D, the buffering server 340, and the destined entity, such as PSAP 316, may utilize symmetric and/or asymmetric keys to encrypt the stored content; communication endpoint 308A-308D, the buffering server 340, and/or the destined entity, such as PSAP 316, may separately, or together, undergo a key exchange process so that the PSAP 316 can decrypt and access the content stored at the buffering server 340. For example, the endpoint 308A-308D may authorize one or more PSAPs 316 to access content stored at the buffering server 340. In one instance, a user 304 may register their endpoint 308A-308D with a specified PSAP, may register their endpoint 308A-308D with a buffering server and/or specified PSAP and/or alternatively may register their endpoint 308A-308D with one or more authentication and/or authorization services that provide a PSAP, contact center, and/or other endpoint with access to the content recorded and stored at the buffering server 340.

In addition, the communication endpoint 308A-308D may provide one or more capabilities for a user to erase content stored in the recorded content buffer 416 and/or any content stored at a buffer server 340. For example, the communication endpoint 308A-308D may provide one or more buttons to cause the content to be erased on demand. The button may be provided by or otherwise accessible via the user interface 428; alternatively, or in addition, such a button may be a hard button or otherwise provided as a function of the endpoint 308A-308D. Alternatively, or in addition, the user 304 may select such a button such that content recorded at the communication endpoint 308A-308D and/or content recorded at the buffer 340 is erased. Furthermore, access controls may provide access restrictions to prevent an unauthorized user from accessing and/or erasing the content stored at the recorded content buffer 416 and/or any content stored at a buffer server 340. For example, accessing and/or erasing the content may require one or more passkeys or other form of elevated security credentials.

Figure 5:
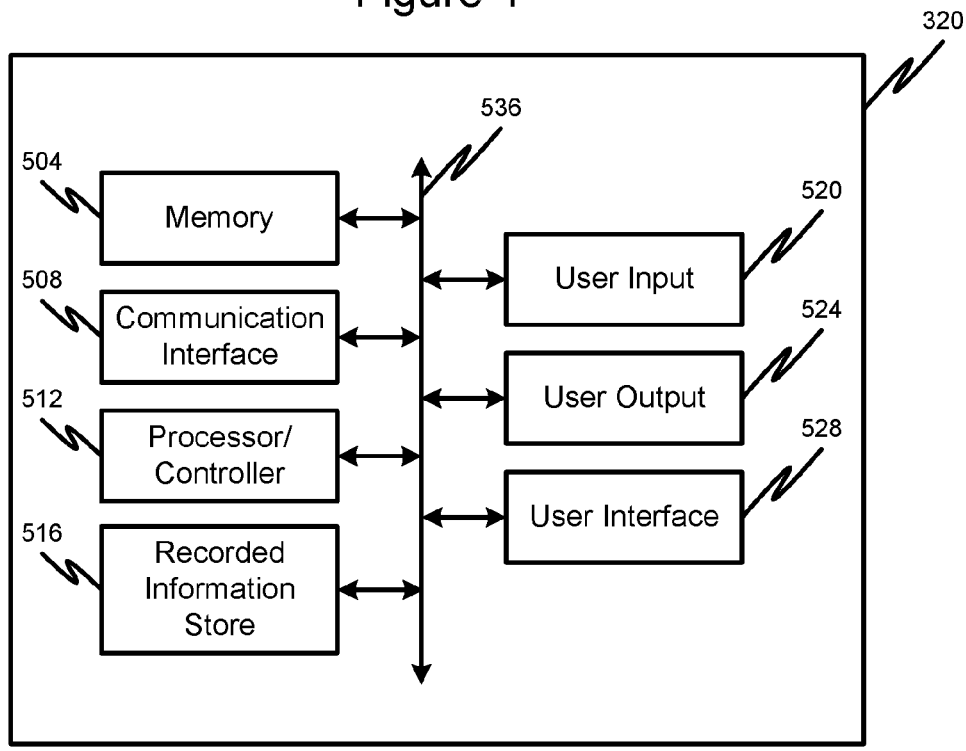
FIG. 5 is a block diagram of a work assignment mechanism in accordance with an exemplary embodiment of the present disclosure.

FIG. 5 illustrates a block diagram depicting one or more components of PSAP 316 work assignment mechanism 320 in accordance with some embodiments of the present disclosure. In some embodiments, the work assignment mechanism 320 may include a processor/controller 512 capable of executing program instructions. The processor/controller 512 may include any general purpose programmable processor or controller for executing application programming. Alternatively, or in addition, the processor/controller 512 may comprise an application specific integrated circuit (ASIC). The processor/controller 512 generally functions to execute programming code that implements various functions performed by the associated server or device. The processor/controller 512 of the work assignment mechanism 320 may operate to route communications and present information to a resource 324.

The work assignment mechanism 320 may additionally include memory 504. The memory 504 may be used in connection with the execution of programming instructions by the processor/controller 512, and for the temporary or long-term storage of data and/or program instructions. For example, the processor/controller 512, in conjunction with the memory 504 of the work assignment mechanism 320, may implement emergency services telephony, application, and web services that are needed and accessed by one or more communication endpoints 308A-308D and the PSAP 316. One or more components of the work assignment mechanism 320 may communicate with another utilizing a communications bus 536.

The memory 504 of the work assignment mechanism 320 may comprise solid-state memory that is resident, removable and/or remote in nature, such as DRAM and SDRAM. Moreover, the memory 504 may comprise a plurality of discrete components of different types and/or a plurality of logical partitions. In accordance with still other embodiments, the memory 504 comprises a non-transitory computer-readable storage medium. Such a medium may take many forms, including, but not limited to, non-volatile media, volatile media, and transmission media.

The work assignment mechanism 320 may further include a communication interface 508, a recorded information store 516, user input 520, user output 524, and a user interface 528. User input devices 520 and user output devices 524 may be provided and used in connection with the routing and processing of calls to a PSAP 316. Examples of user input devices 520 include a keyboard, a numeric keypad, a touch screen, a microphone, scanner, and pointing device combined with a screen or other position encoder. Examples of user output devices 524 include a display, a touch screen display, a speaker, and a printer. The work assignment mechanism 320 also generally includes a communication interface 508 to interconnect the work assignment mechanism 320 to the communication network 312.

In accordance with some embodiments, the recorded information store 516 comprises one or more locations for storing the content transmitted by the communication endpoint 308A-308D. In one instance, the recorded information store 516 is accessible to a call-taker in a PSAP 316 such that the call-taker is able to review the stored content. Moreover, the content in the recorded information store 516 may alter a caller's 304 position in a queue associated with the work assignment mechanism 320. For example, keywords may be identified and associated with a caller requiring assistance sooner than later. As one example, the content transmitted to the recorded information store 516 may be audio data, which is parsed by the work assignment mechanism 320 for keywords, such as "bleeding," "head injury," "chest pain," etc. In some situations, the existence of the keywords may alter a caller's 304 position in a queue.

Figure 6:
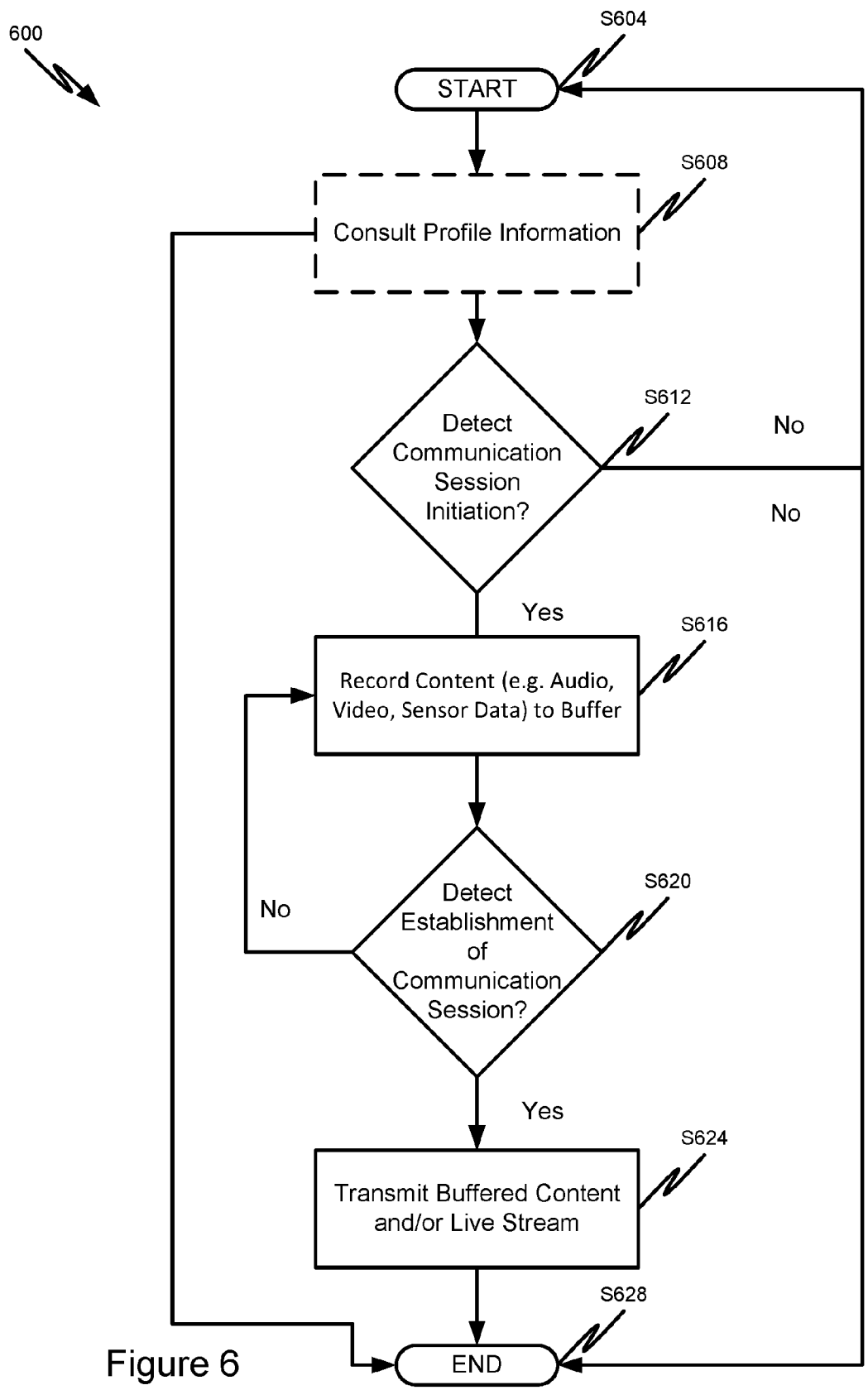
FIG. 6 is a flow diagram depicting a method associated with a communication endpoint in accordance with an exemplary embodiment of the present disclosure.

Referring now to FIG. 6, a method 600 of buffering and transmitting content will be discussed in accordance with embodiments of the present disclosure. Method 600 is in embodiments, performed by a device, such as a communication endpoint 308A-308D. More specifically, one or more hardware and software components may be involved in performing method 600. In one embodiment, one or more of the previously described modules and/or devices perform one or more of the steps of method 600. The method 600 may be executed as a set of computer-executable instructions executed by a computer system communication endpoint 308A-308D encoded or stored on a computer-readable medium. Hereinafter, the method 600 shall be explained with reference to systems, components, modules, software, etc. described with respect to FIGS. 1-5.

Method 600 may continuously flow in a loop, flow according to a timed event, or flow according to a change in an operating or status parameter. Method 600 is initiated at step S604 where a user 304 may initiate a communication using a communication endpoint 308A-308D. Alternatively, or in addition, step S604 may be initiated when a user activates or otherwise interacts with an endpoint 308A-308D. At optional step S608, a profile, such as the content recording profile 432 is consulted. If for example, the content recording profile 432 is configured such that the communication endpoint 308A-308D is not to record content, the method 600 may end at step S628. Otherwise, method 600 may proceed to step S612 where the method 600 detects the initiation of the communication session. Such an initiation of a communication may be in response to an event that occurs and may further be directed to a contact center, such as a PSAP 316. As one example, the initiation of the communication session may coincide with the communication endpoint 308A-308D initiating a media flow in the case of a WebRTC session, or sending an invite message in the case of a SIP communication. Alternatively, or in addition, the initiation of a communication session may correspond to a user dialing a phone number and/or selecting a contact address that matches a number and/or address in a content recording profile 432. In at least one instance, the initiation of a communication session is detected based on the initiation of a communication session corresponding to an outbound user-initiated emergency request. If a communication initiation is not detected at step S612, method 600 may proceed back to step S604 where method 600 begins again. Otherwise, upon the detection of an initiation of a communication session S612, method 600 proceeds to step S616.

At step S616, the method 600 may initiate the recording of content, such as audio, video, and/or sensor data, as non-limiting examples. Such content may be recorded to a buffer, such as the recorded content buffer 416 and/or to a buffer located at a buffering server 340. Method 600 then proceeds to step S620 where the communication endpoint 308A-308D detects whether or not a communication session has been established. For example, the establishment of the communication session may depend on one or more factors. For instance, the establishment of a communication session may correspond to a point in time when the PSAP 316 is able to receive content transmitted from the communication endpoint 308A-308D. That is, the content may be transmitted from the communication endpoint 308A-308D, received at a PSAP 316, and stored in a recorded information store 516. In some embodiments, the establishment of a communication session may coincide with a call-taker selecting a queue position and/or being assigned a queue position corresponding to a user's 304 queue positions. That is, once the call-taker selects the user 304, the communication session may have been "established". Alternatively, or in addition, the establishment of a communication session may coincide with one or more signals, messages, and/or packets received according to one or more protocols. For instance, the communication session may be "established" when the communication endpoint 308A-308D receives an OK message in a SIP protocol and/or a datachannel is created in the context of a WebRTC operation. Alternatively, or in addition, the establishment of a communication session may coincide with an end-user answering and/or accepting a phone call, incoming session request, and/or request to chat. For example, if a caller 304 places a phone call on a telephone over a Public Switched Telephone Network (PSTN) network to a destination device, when an end-user picks up and/or answers the phone call at the destination device, the session may be "established." As another example, if a caller 304 places a phone call on a cell phone to a destination device, when an end-user picks up and/or answers the phone call at the destination device, the session may be "established." As another example, if a caller 304 initiates a chat request with a user at an end device, when the user at the end device accepts the chat request, the session may be "established." If a communication session has not yet been "established," the method 600 may return to step S616. Otherwise, once a communication session is established, the method 600 proceeds to step S624 where the recorded content is transmitted. Additionally, the live stream, such as a live voice, audio, video or other stream, is transmitted. Method 600 then ends at step S628.

Figure 7:
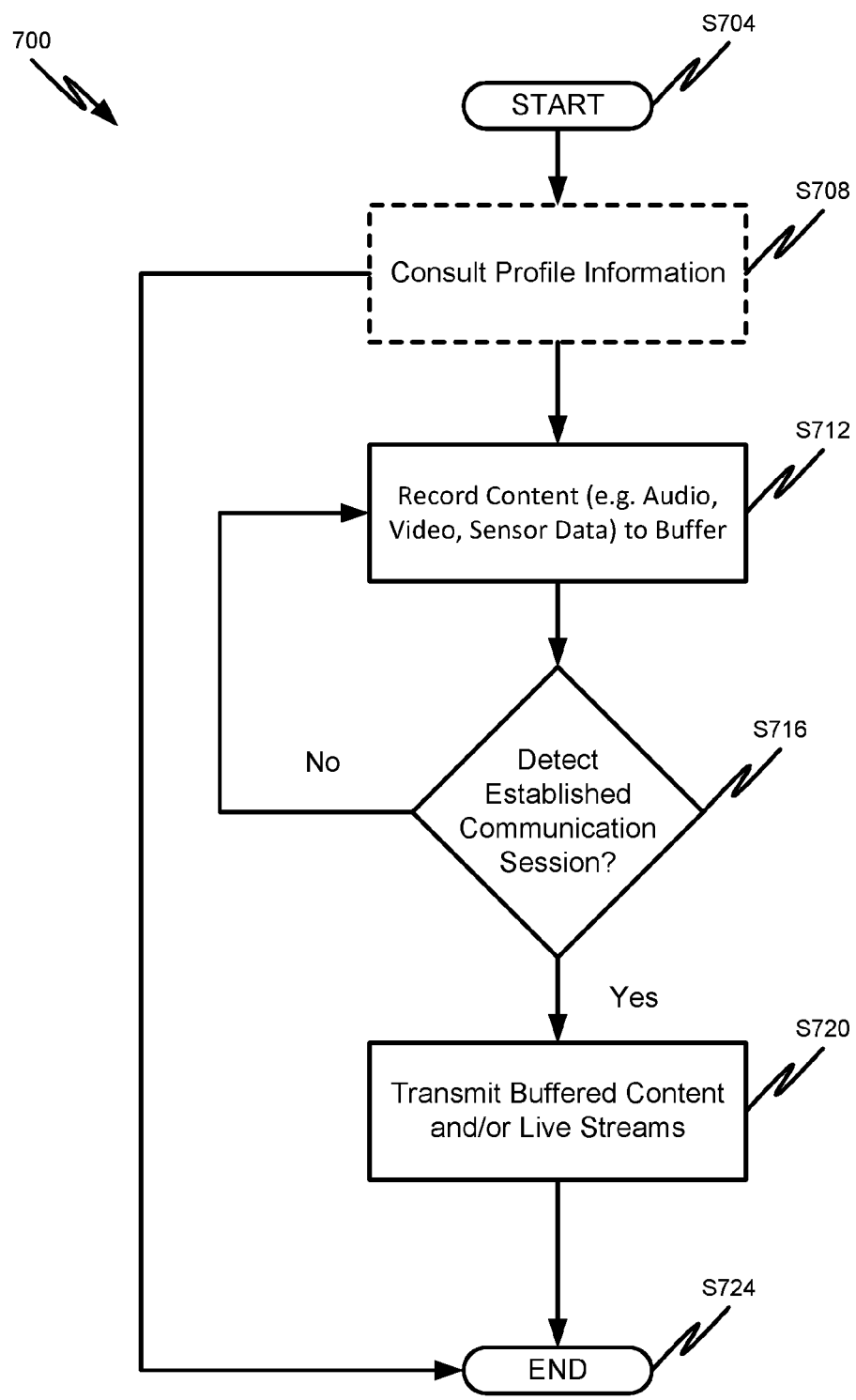
FIG. 7 is a second flow diagram depicting a method associated with a communication endpoint in accordance with an exemplary embodiment of the present disclosure.

Referring now to FIG. 7, a method 700 of buffering and transmitting content will be discussed in accordance with embodiments of the present disclosure. Method 700 is in embodiments, performed by a device, such as a communication endpoint 308A-308D. More specifically, one or more hardware and software components may be involved in performing method 700. In one embodiment, one or more of the previously described modules and/or devices perform one or more of the steps of method 700. The method 700 may be executed as a set of computer-executable instructions executed by a computer system communication endpoint 308A-308D encoded or stored on a computer-readable medium. Hereinafter, the method 700 shall be explained with reference to systems, components, modules, software, etc. described with respect to FIGS. 1-6.

Method 700 may continuously flow in a loop, flow according to a timed event, or flow according to a change in an operating or status parameter. Method 700 is different from method 600 in that method 700 may continuously record content, such as audio, video, and/or sensor content, as non-limiting examples. Method 700 is initiated at step S704. Method 700 may then proceed to step S708 where an option profile, such as the content recording profile 432 is consulted. If, for example, the content recording profile 432 is configured such that the communication endpoint 308A-308D is not to record content, the method 700 may end at step S724. Otherwise, method 700 may proceed to step S712 where the method 700 initiates the recording of content, such as audio and video data. Such content may be recorded to a buffer (e.g., buffered) such as the recorded content buffer 416 and/or to a buffer located at a buffering server 340. Method 700 then proceeds to step S716 where the communication endpoint 308A-308D detects whether or not a communication session has been established. For example, and as previously discussed, the establishment of the communication session may depend on one or more factors. For instance, the establishment of a communication session may correspond to a point in time when the PSAP 316 is able to receive content transmitted from the communication endpoint 308A-308D. That is, the content may be transmitted from the communication endpoint 308A-308D, received at a PSAP 316, and stored in a recorded information store 516. In some embodiments, the establishment of a communication session may coincide with a call-taker selecting a queue position corresponding to a user's 304 queue positions. That is, once the call-taker selects the user 304, the communication session may have been "established." Alternatively, or in addition, the establishment of a communication session may coincide with one or more signals, messages, and/or packets received according to one or more protocols. For instance, the communication session may be "established" when the communication endpoint 308A-308D receives an OK message in a SIP protocol and/or a datachannel is created in the context of a WebRTC operation. Alternatively, or in addition, the establishment of a communication session may coincide with an end-user answering and/or accepting a phone call, incoming session request, and/or request to chat. For example, if a caller 304 places a phone call on a telephone over a PSTN network to a destination device, when an end-user picks and/or answers the phone call at the destination device, the session may be "established." As another example, if a caller 304 places a phone call on a cell phone to a destination device, when an end-user picks up and/or answers the phone call at the destination device, the session may be "established." As another example, if a caller 304 initiates a chat request with a user at an end device, when the user at the end device accepts the chat request, the session may be "established." If a communication session has not yet been "established," the method 700 may return to step S712. Otherwise, once a communication session is established, the method 700 proceeds to step S720 where the recorded content is transmitted. Additionally, the live stream, such as a live voice, audio, video or otherwise stream, is transmitted as well. Method 700 then ends at step S724.

Figure 8:
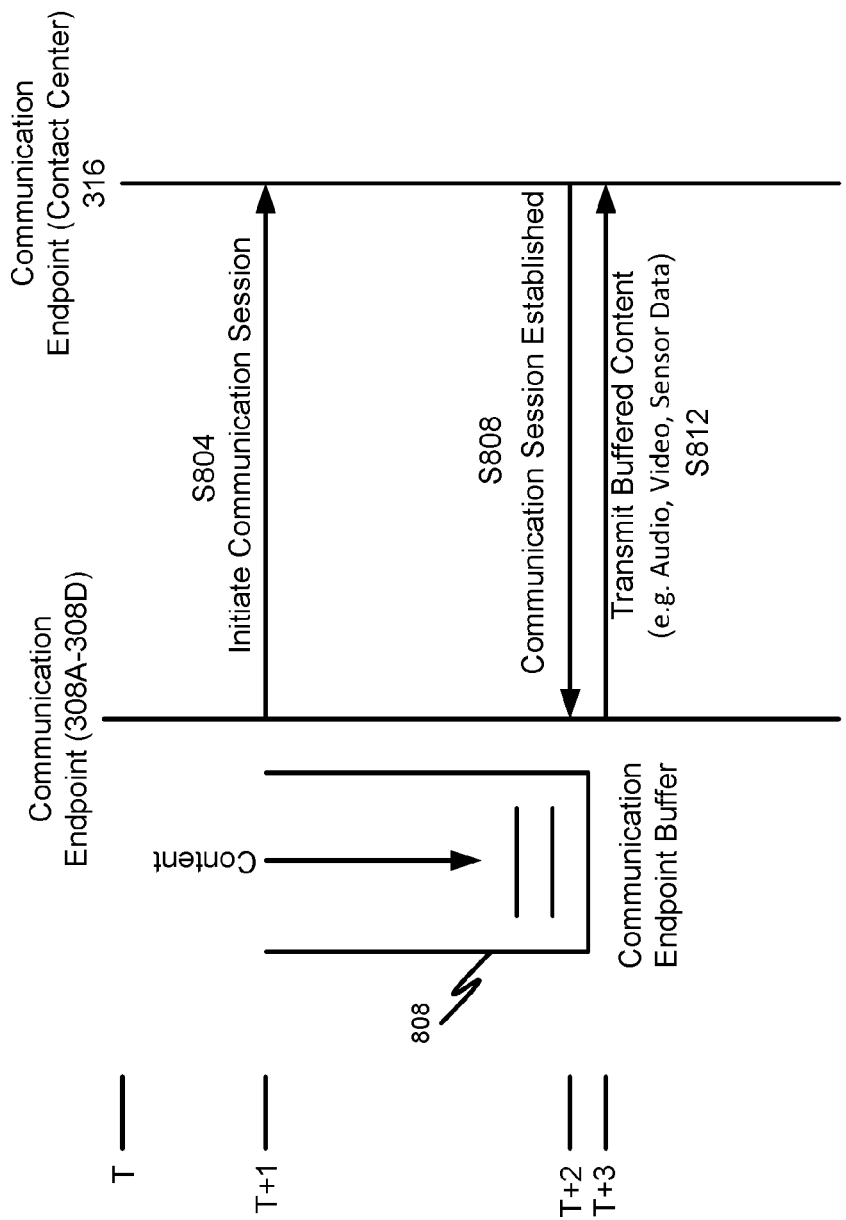
FIG. 8 is a communication diagram depicting one or more communications associated with a communication endpoint in accordance with an exemplary embodiment of the present disclosure.

FIGS. 8-12 provide a general communication diagram in accordance with embodiments of the present invention. In FIGS. 8-12, and at a time equal to T, one or more events may occur. It is important to note that the additions to T simply indicate a progression of time; that is, there are no units assigned to a time equal to T, T+1, T+2, and/or T+3. As illustrated in FIG. 8, an event may occur at a time equal to T. At a time equal to T+1, a communication endpoint, such as 308A-308D, initiates a communication session with another communication endpoint, such as a contact center (PSAP) 316 at step S804. Upon the initiation of the communication session and at a time equal to T+1, content is stored in a communication endpoint buffer 808. Communication endpoint buffer 808 may correspond to the recorded content buffer 416. At a time equal to T+2, the communication endpoint may receive an indication that the communication session has been established, at step S808. For example, the communication endpoint 316 may send a confirmation message indicating that a communication session has been established in a manner previously described. At a time equal to T+3, the communication endpoint 308A-308D may then provide the buffered content, such as audio and video, to the contact center 316, at step S812.

Figure 9:
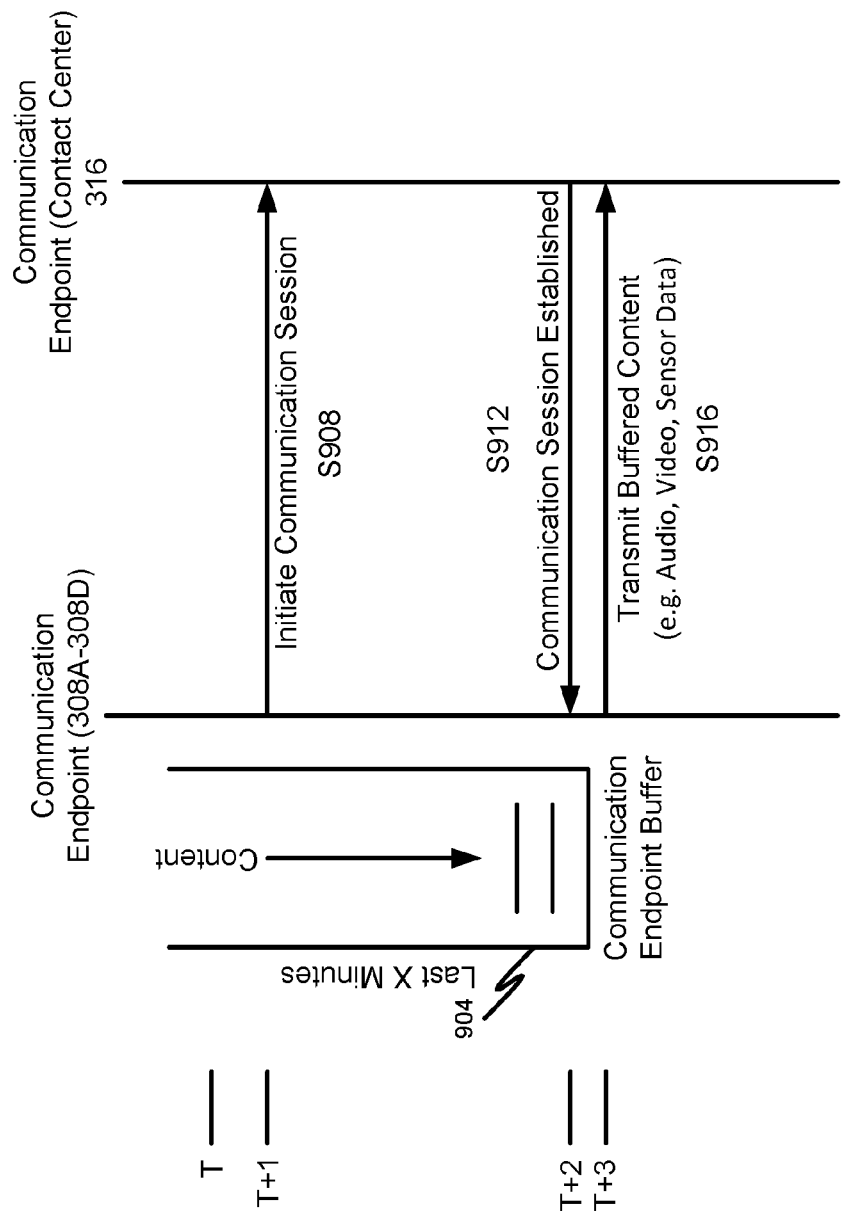
FIG. 9 is a second communication diagram depicting one or more communications associated with a communication endpoint in accordance with an exemplary embodiment of the present disclosure.

As illustrated in FIG. 9, content corresponding to the last X minutes may be constantly recorded to a communication endpoint buffer 904. Communication endpoint buffer 904 may correspond to the recorded content buffer 416. An event may occur at time equal to T. At a time equal to T+1, a communication endpoint, such as 308A-308D, initiates a communication session with another communication endpoint, such as a contact center (PSAP) 316 at step S908. At a time equal to T+2, the communication endpoint may receive an indication that the communication session has been established, at step S912. For example, the communication endpoint 316 may send a confirmation message indicating that a communication session has been established in a manner previously described. At a time equal to T+3, the communication endpoint 308A-308D may then provide the buffered content, such as audio and video, to the contact center 316, at step S916.

Figure 10:
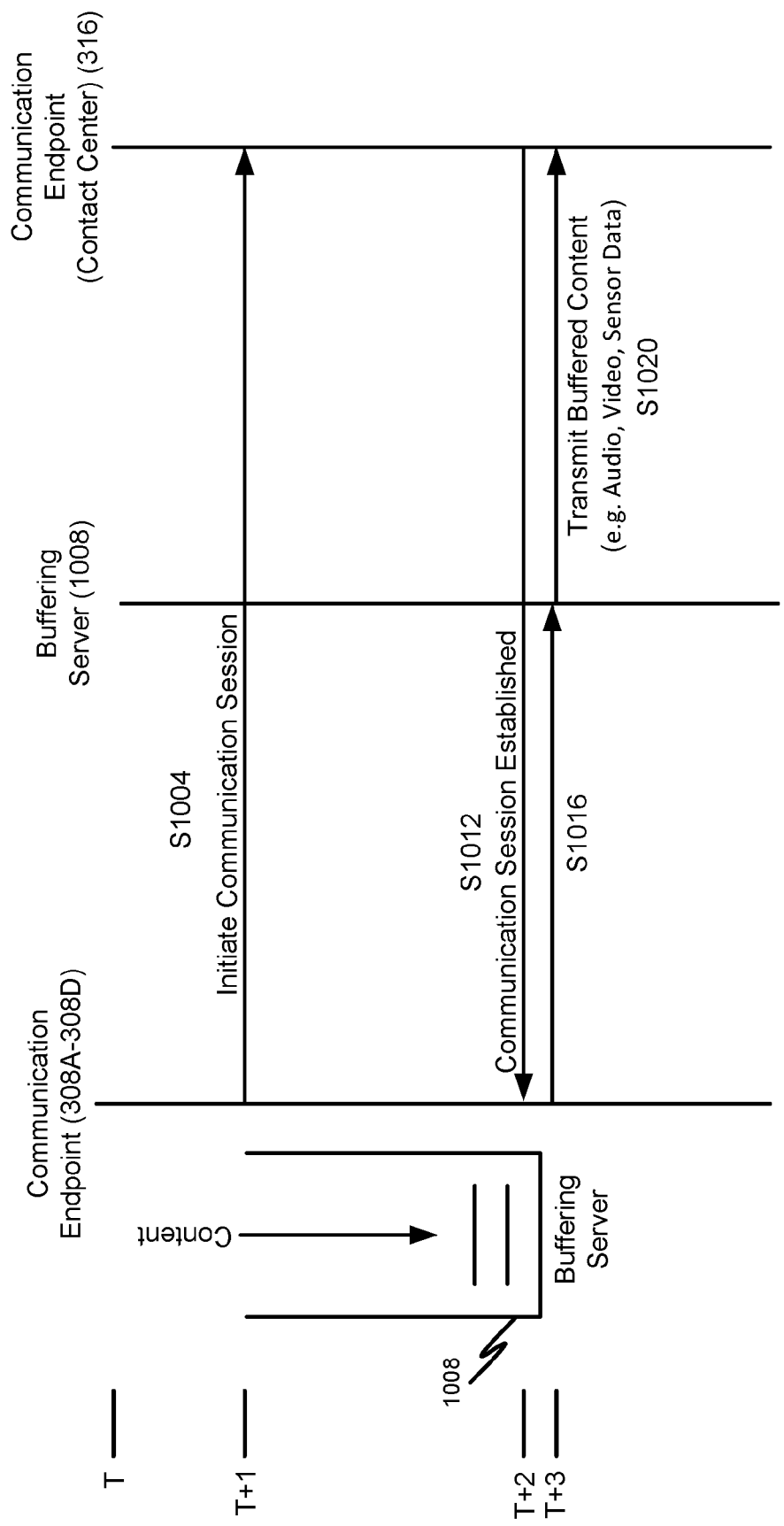
FIG. 10 is a third communication diagram depicting one or more communications associated with a communication endpoint in accordance with an exemplary embodiment of the present disclosure.

As illustrated in FIG. 10, an event may occur at a time equal to T. At a time equal to T+1, a communication endpoint, such as 308A-308D, initiates a communication session with another communication endpoint, such as a contact center (PSAP) 316 at step S1004. Upon the initiation of the communication session and at a time equal to T+1, content is stored at a buffering server 1008. The buffering server 1008 may correspond to the buffering server 340 as previously described. At a time equal to T+2, the communication endpoint may receive an indication that the communication session has been established, as step S1012. For example, the communication endpoint 308A-308D may send a confirmation message indicating that a communication session has been established in a manner previously described. At a time equal to T+3, the buffering server 1008 may then provide the buffered content, such as audio, video, or other sensor data, to the contact center 316, as step S1020. For example, in the event the buffering server 1008 resides at a communication server and/or switch and the communication server and/or switch is aware of the end point communication session, the communication server and/or switch may provide an indication to the buffering server 1008 informing the buffering server 1008 that it should transmit the buffered content to the contact center 316. Alternatively, or in addition, the communication endpoint 308A-308D may send a message to the buffering server 1008 at step S1016 indicating that a communication session as been established. In response to receiving the message, the buffering server 1008 may then transmit the buffered content, such as audio and video, to the contact center 316, as step S1020.

Figure 11:
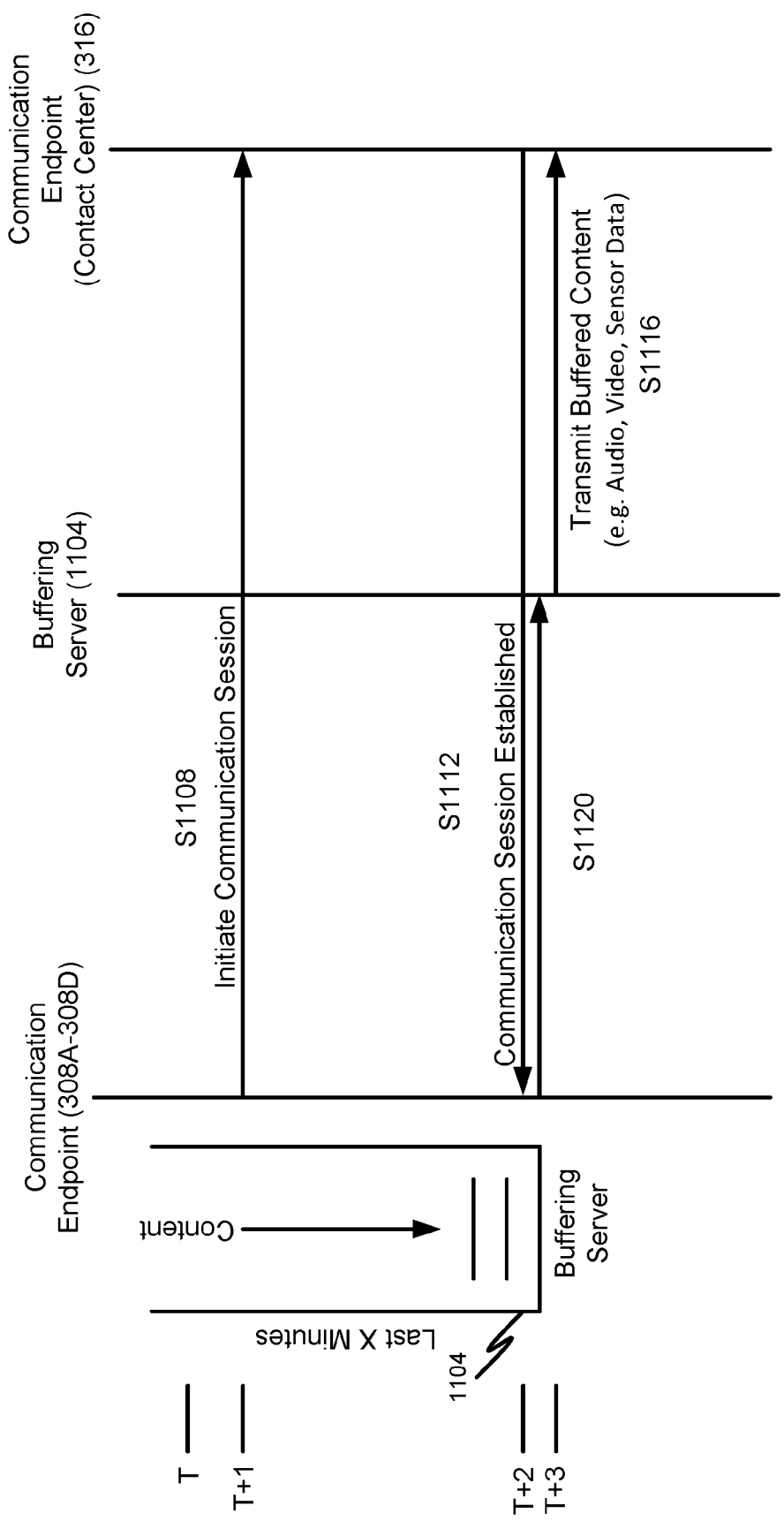
FIG. 11 is a fourth communication diagram depicting one or more communications associated with a communication endpoint in accordance with an exemplary embodiment of the present disclosure.

As illustrated in FIG. 11, content corresponding to the last X minutes may be constantly recorded to a buffering server 1104. The buffering server 1104 may correspond to the buffering server 340 as previously described. An event may occur at time equal to T. At a time equal to T+1, a communication endpoint, such as 308A-308D, initiates a communication session with another communication endpoint, such as a contact center (PSAP) 316, at step S1108. At a time equal to T+2, the communication endpoint may receive an indication that the communication session has been established, at step S1112. For example, the communication endpoint 308A-308D may send a confirmation message indicating that a communication session has been established in a manner previously described. At a time equal to T+3, the buffering server 1104 may then provide the buffered content, such as audio and video, to the contact center 316, as step S1116. Alternatively, or in addition, the communication endpoint 308A-308D may send a message to the buffering server 1104 at step S1120 indicating that a communication session has been established. In response to receiving the message, the buffering server 1104 may then transmit the buffered content, such as audio and video, to the contact center 316, at step S1116.

Figure 12:
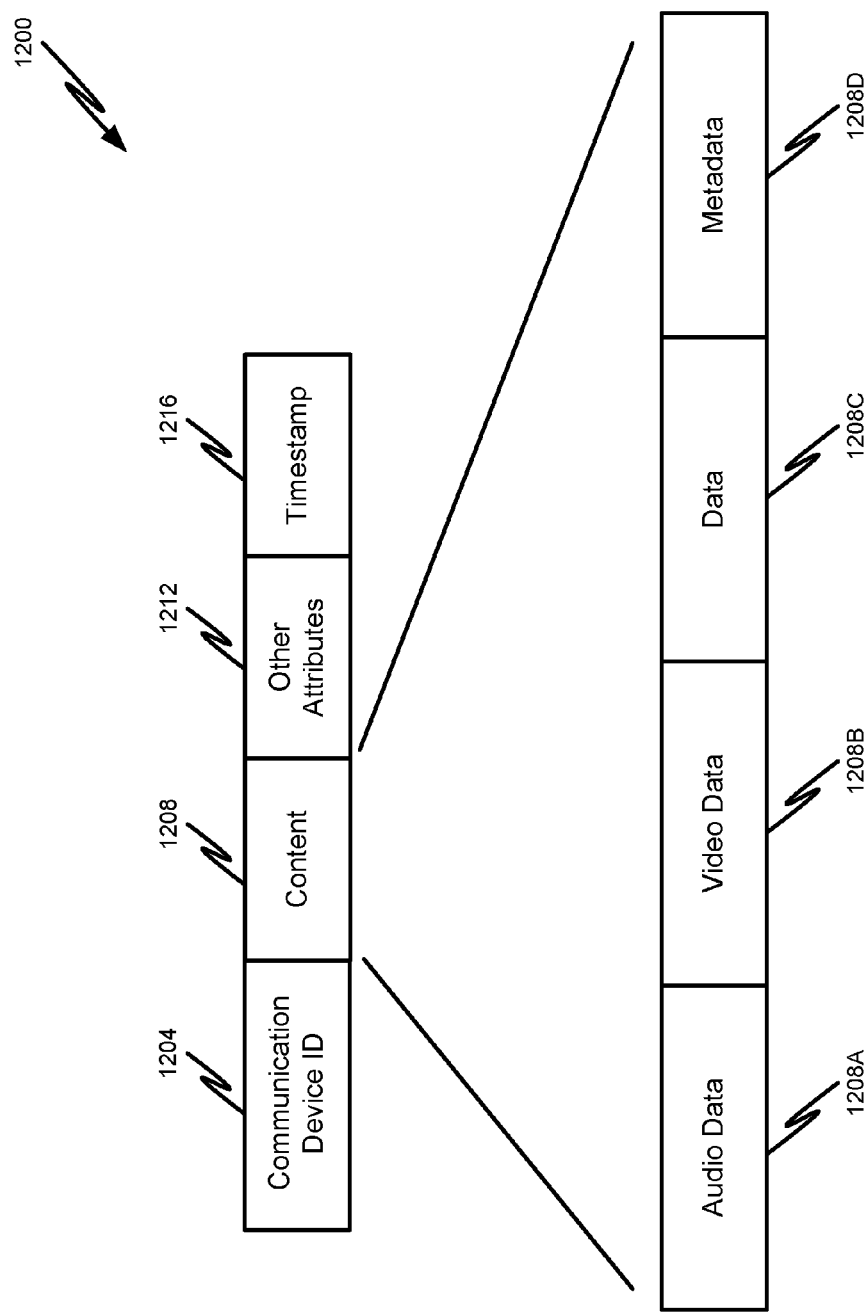
FIG. 12 depicts a data structure in accordance with an exemplary embodiment of the present disclosure.

With reference to FIG. 12, details of a data structure 1200 will be described in accordance with embodiments of the present disclosure. In some embodiments, the data structure 1200 can be used to further define attributes and/or metadata about information stored in the communication endpoint 308A-308D and/or the buffering server 340. The data structure 1200 may be partially or completely stored in at least one buffer, memory 404 of the communication endpoint 308A-308D and/or in any other computer memory that is maintaining an instance of information for a user 304. Examples of fields that may be provided in the data structure

1200 include, without limitation, communication device identification field 1204, content field 1208, other attributes field 1212, and a time stamp field 1216.

In some embodiments, the communication device identification field 1204 may comprise information that enables a unique identification of the communication endpoint 308A-308D, within a communication network 312. For instance, a pseudo-randomly generated personal electronic device identification number may be contained in the communication device identification field 1204. Other non-limiting examples of personal electronic device information include, without limitation, a phone number, an IP address, an Electronic Serial Number (ESN), and so on.

The Content field 1208 may include, but is not limited to, audio data 1208A, video data 1208B, other data, 1208C, and metadata 1208D. For example, in instances where buffered audio and video data are transmitted from the communication endpoint 308A-308D, the content field 1208 may comprise audio data 1208A and video data 1208B. In some instances, metadata 1208D associated with one or more content sensors 444 and or the information obtained by the one or more content sensors 444 may be included. Such information may be metadata 1208D provided by data derived from EXIF metadata associated with one or more types of content. Example metadata 1208D may contain location information, lighting condition information, frame rate, exposure time, and the like.

The other attributes information field 1212 may comprise information similar to the communication device identification field 1204, but the attributes information may not necessarily correspond to information used in connection with the communication endpoint 308A-308D. For example, the PSAP 316 may be capable of receiving other attributes, such as push information, a priority level, location information, etc. Other examples of information that may be maintained in the other attributes information field 1212 may include, without limitation, anomaly update information, user id information, identification that may be used to link or identify user 304 to/in an information database, and so on.

The timestamp information field 1216 may comprise information that specifies a time at which the information in the content data field 1208 was sent and/or obtained from the communication endpoint 308A-308D sent.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (Graphics Processing Unit (GPU) or Central Processing Unit (CPU)) or logic circuits programmed with the instructions to perform the methods (Field Programmable Gate Array (FPGA)). These machine-executable instructions may be stored on one or more machine readable mediums, such as Compact Disc Read-only Memories (CD-ROMs) or other type of optical disks, floppy diskettes, Read-only Memories (ROMs), Random-access Memories (RAMs), Erasable Programmable Read-only Memories (EPROMs), Electrically Erasable Programmable Read-only Memories (EEPROMs), magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method comprising:
   determining a power level associated with a first endpoint;
   determining a media content recording mode for the first endpoint based on the power level, wherein determining the media content recording mode includes selecting from a first media content recording mode and a second media content recording mode, wherein the first media content recording mode records media content continuosly, over a selected time period, to at least one buffer associated with the first endpoint when the power level is determined to be greater than or equal to a first threshold, and wherein the second media content recording mode records media content to the at least one buffer only at an initiation of a communication session when the power level is determined to be less than the first threshold;
   determining media content to record based on the power level, wherein media content that is recorded when the power level is determined to be less than or equal to a second threshold different from the first threshold is different from media content that is recorded when the power level is determined to be greater than the second threshold; and
recording the determined media content to the at least one buffer in accordance with the determined media content recording mode.

2. The method of claim 1, wherein the first and second media content recording modes occur over different time periods and further comprising:
establishing a communication session between the first endpoint and the second endpoint;
transmitting the media content recorded to the at least one buffer from the at least one buffer to the second endpoint using the communication session; and
transmitting real-time content using the communication session.

3. The method of claim 1, wherein the second endpoint includes a buffering server, the method further comprising:
transmitting the media content recorded to the at least one buffer from the at least one buffer to the buffering server; and
transmitting, to a third endpoint from the buffering server, the media content recorded to the at least one buffer.

4. The method of claim 1, further comprising:
detecting an initiating of a communication session corresponding to an outbound user-initiated emergency request between the first endpoint and the second endpoint;
recording media content in accordance with the second media content recording mode; and
transmitting, across a communication network from the first endpoint to a second endpoint, the media content recorded to the at least one buffer.

5. The method of claim 1, wherein the second endpoint is a Public Safety Answering Point (PSAP), the method further comprising:
verifying that a communication session has been established between the first endpoint and the PSAP before transmitting the media content recorded to the at least one buffer.

6. The method of claim 1, wherein the first endpoint is at least one of: (i) a mobile device; (ii) a communications client residing on a device including a processor and memory; (iii) a Web Real-Time Communication (WebRTC) browser or application instance; (iv) a desktop phone; (v) a tablet; and (vi) a computer and further comprising:
transmitting, across a communication network from the first endpoint to a second endpoint, the media content recorded to the at least one buffer.

7. The method of claim 1, wherein the media content determined to be recorded when the power level is less than or equal to the second threshold includes only audio data, wherein one or more of sensor data, image data, health information data, metadata associated with the image data, metadata associated with the audio data, metadata associated with video data, location information, and other communication device or client data is transmitted to the second endpoint, and one or more messages or flows indicating that a communication session has been established is received at the first endpoint.

8. The method of claim 1, further comprising:
determining whether to transmit one or more of audio data, video data, sensor data, and image data according to priority information, wherein the priority information is based on one or more of an estimated power usage of the first endpoint, a bandwidth requirement, and a profile associated with the first endpoint.

9. The method of claim 1, further comprising at least one of the following:
(i) authorizing a user to access the media content recorded to the at least one buffer;
(ii) verifying that the second endpoint is authorized to receive the media content; and
(iii) encrypting the media content.

10. The method of claim 1, further comprising:
initiating a first communication session between the first endpoint and the second endpoint;
establishing a second communication session between the first endpoint and the second endpoint; and
transmitting the media content recorded to the at least one buffer to the second endpoint using the second communication session, wherein the second communication session includes a Web Real-Time Communication (WebRTC) data channel and the recorded media content is transmitted to the second endpoint via the WebRTC data channel.

11. A tangible computer-readable storage device comprising processor-executable instructions operable to perform the method of claim 1.

12. A method comprising:
determining a media content recording mode for a first endpoint, wherein determining the media content recording mode includes selecting from a first media content recording mode and a second media content recording mode, wherein the first media content recording mode records media content continuously, over a selected time period, to at least one buffer associated with the first endpoint, and wherein the second media content recording mode records media content to the at least one buffer only when a communication session is initiated;
determining a type of media content to record based on an attribute of the first endpoint, wherein determining the type of media content to record includes selecting from a first media content type and a second media content type; and
recording media content of the determined type of media content to the at least one buffer in accordance with the determined media content recording mode, wherein media content including audio data is recorded to the at least one buffer in the second media content recording mode.

13. The method of claim 12, further comprising transmitting real-time content including one or more of audio and video data from the first endpoint to the second endpoint while transmitting the media content recorded to the at least one buffer.

14. The method of claim 12, wherein the first and second media content recording modes occur over different time periods and further comprising:
transmitting the media content recorded to the at least one buffer from the at least one buffer to a buffering server; and
transmitting, to a third endpoint from the buffering server, the media content recorded to the at least one buffer.

15. The method of claim 12, wherein the at least one buffer is located at a location other than the first endpoint and further comprising:
transmitting via a WebRTC data channel, the media content recorded to the at least one buffer from the at least one buffer to a second endpoint.

16. The method of claim 12, wherein the first endpoint is at least one of: (i) a mobile device; (ii) a communications client residing on a device including a processor and memory; (iii) a WebRTC browser or application instance; (iv) a desktop phone; (v) a tablet; and (vi) a computer and further comprising:

transmitting via a WebRTC data channel, the media content recorded to the at least one buffer from the at least one buffer to a second endpoint.

17. The method of claim 12, wherein the media content includes one or more of sensor data, health information data, image data, metadata associated with the image data, metadata associated with audio data, metadata associated with video data, location information, and other communications device or client data, and one or more messages or flows indicating that a communication session has been established is received at the first endpoint and further comprising:

transmitting via a WebRTC data channel, the media content recorded to the at least one buffer from the at least one buffer to a second endpoint.

18. A computer-readable storage device comprising processor-executable instructions operable to perform the method of claim 12.

19. A system for providing a prior-to-emergency communication request, the system comprising:

a first endpoint operable to transmit and receive media, initiate two-way media exchanges with a second endpoint, and receive communication requests from, and establish two-way media exchanges with, the second endpoint; and at least one circular buffer located at the first endpoint, the at least one circular buffer recording media content in response to profile information and a detected power level of the first endpoint, wherein the first endpoint is operable to transmit to the second endpoint one of a determined first or second type of media content upon establishing a communication session between the first endpoint and the second endpoint, wherein the profile information configures the first endpoint to continuously record media content, over a selected time period, to the at least one circular buffer when the power level is determined to be greater than or equal to a first threshold, wherein the profile information configures the first endpoint to record media content to the at least one circular buffer only when a communication session is initiated and when the detected power level is determined to be less than the first threshold, wherein the profile information configures the first endpoint to record the first type of media content when the power level is less than or equal to a second threshold different from the first threshold, and wherein the profile information configures the first endpoint to record the second type of media content when the power level is greater than the second threshold.

20. The system of claim 19, wherein the first and second media content recording modes occur over different time periods and further comprising:

determining whether to transmit to the second endpoint audio content, video content, or audio and video content based on the detected power level.

* * * * *

UNITED STATES PATENT AND TRADEMARK OFFICE
CERTIFICATE OF CORRECTION

| | | |
|---|---|---|
| PATENT NO. | : 10,033,862 B2 | Page 1 of 1 |
| APPLICATION NO. | : 13/959517 | |
| DATED | : July 24, 2018 | |
| INVENTOR(S) | : John H. Yoakum and Paul Roller Michaelis | |

It is certified that error appears in the above-identified patent and that said Letters Patent is hereby corrected as shown below:

In the Claims

At Column 24, Line 31, please delete "continuosly" and replace it with --continuously-- therein.

Signed and Sealed this
Eleventh Day of September, 2018

Andrei Iancu
*Director of the United States Patent and Trademark Office*